US 6,660,788 B2

(12) United States Patent
Loos et al.

(10) Patent No.: US 6,660,788 B2
(45) Date of Patent: Dec. 9, 2003

(54) WATER BORNE BINDER COMPOSITION

(75) Inventors: Francis Jean Roger Loos, Hove (BE); Geneviève Hélène Christiane Delaunoit, Antwerp (BE); Dirk Emiel Paula Mestach, Nijlen (BE)

(73) Assignee: Akzo Nobel N.V., Arnhem (NL)

( * ) Notice: Subject to any disclaimer, the term of this patent is extended or adjusted under 35 U.S.C. 154(b) by 210 days.

(21) Appl. No.: 09/879,377

(22) Filed: Jun. 12, 2001

(65) Prior Publication Data

US 2002/0035189 A1 Mar. 21, 2002

(30) Foreign Application Priority Data

Jun. 13, 2000 (EP) .............................. 00202056

(51) Int. Cl.$^7$ ............................. C08K 5/17; C08K 5/09; C08K 39/04; B32B 23/08
(52) U.S. Cl. ....................... 524/236; 524/399; 524/401; 524/808; 524/831; 523/122; 428/507
(58) Field of Search .......................... 523/122; 524/236, 524/399, 401, 808, 831; 428/507

(56) References Cited

U.S. PATENT DOCUMENTS 5,149,729 A * 9/1992 Englund
5,460,644 A * 10/1995 Thomassen

* cited by examiner

*Primary Examiner*—Tae H. Yoon
(74) *Attorney, Agent, or Firm*—Lainie E. Parker; Michelle J. Burke; David H. Vickrey

(57) ABSTRACT

A water borne binder composition comprising (a) an aqueous dispersion of an acrylic copolymer comprising carboxylic acid and ethylene-urea functionality, having a weight average molecular weight below 200,000 and a Tg<-15° C., as calculated from the monomer composition using the Fox equation; and (b) a water soluble complex of a transition metal, preferably zinc. A coating composition comprising the water borne binder and a wood substrate coated with the coating composition

13 Claims, No Drawings

WATER BORNE BINDER COMPOSITION

This application claims priority based on EP 00202056.8, filed Jun. 13, 2000.

FIELD OF THE INVENTION

This invention pertains to a water borne binder composition, a coating composition comprising the same, and a wood substrate coated with said coating composition.

More particularly, this invention pertains to aqueous wood coating compositions and to wood substrates or substrates made from processed wood, such as hardboard, paper or chipboard, with said water borne binder composition.

BACKGROUND OF THE INVENTION

Environmental legislation is the driving force behind the change from solvent borne coatings to water borne systems. Limits have been established for the amounts of volatile organic compound that are allowed in different coating systems. Until now water borne coatings have found limited acceptance in wood finishing. The use of water borne coatings in the finishing of wood generally has several disadvantages over conventional solvent based coatings, since the water-soluble chromophoric compounds that are present in wood, such as tannins, bleed trough the applied water borne coating to stain and discolor the finish. Furthermore, it is difficult to obtain a satisfactory combination of desirable properties for wood finishes, such as flexibility, surface hardness, sandability, scrub resistance, water whitening resistance, corrosion resistance, and adhesion and blocking resistance. It is especially difficult to obtain a desirable balance between flexibility and proper film formation and hardness/sandability when the amount of volatile organic compounds in the coating composition is limited to 100 g/l.

In attempts to improve the tannin stain blocking of water borne coatings several approaches have been followed, which are described in the patent literature. Reactive pigments generally are quite effective in blocking tannins. However, in practice they have some major drawbacks, since they can cause stability problems such as viscosity increase and polymer gelation or coagulation. Obviously, this solution is limited to pigmented coatings. It is therefore desirable to obtain the tannin blocking properties without the use of reactive pigments, in other words, by modification of the binder composition.

In EP 849,004 an attempt was made to overcome the above-mentioned disadvantages, by proposing a method for the tandem coating of wood substrates. This method comprises the application of two separate coatings, one of them a highly crosslinked coating and the other is a cured coating formed from an aqueous coating composition. The cured coating is formed from an aqueous composition comprising a carbonyl-functional polymer, preferably consisting of ethylene-ureido-containing monomers.

In U.S. Pat. No. 5,141,784 a process is disclosed for treating wood substrates with an effective amount of a carboxylic acid salt and/or a water-soluble compound having one or two salt forming amine groups and having a molecular weight of 50 to about 300,000. In U.S. Pat. No. 4,075,394 the application of an aqueous solution of a polyalkylene imine when treating tannin-containing surfaces is disclosed. Other approaches include the use of cationic binders. The main drawback in that case is the limited availability of paint ingredients that are cationic.

All of the above-mentioned methods suffer from various disadvantages, such as insufficient stability, poor film-forming properties, and insufficient hardness, sandability, scrub resistance, water whitening resistance, corrosion resistance, adhesion and/or blocking resistance, or difficult handling of the coating composition.

SUMMARY OF THE INVENTION

It has now been found that by using a combination of a transition metal complex and a composition comprising a copolymer having a specific molecular weight and a specific Tg, coating compositions are obtained that are devoid of the above-mentioned disadvantages and can easily be applied onto wood substrates without the need to use different coating layers. The invention more specifically pertains to a water borne binder composition comprising a) an aqueous dispersion of an acrylic copolymer comprising carboxylic acid and ethylene-urea functionalities, having a weight average molecular weight below 200,000 and a $Tg<-15°$ C.; and b) a water-soluble complex of a transition metal.

Stable clear and pigmented water borne coating compositions can be prepared with this binder composition, which can be used advantageously at VOC levels below 100 g/l. After drying the coating compositions give coatings with excellent hardness and good flexibility. These coatings also have a property that prevents the migration of tannins from tannin-containing wood substrates.

DETAILED DESCRIPTION OF THE INVENTION

According to the present invention, a water borne polymer is provided, preferably prepared from ethylenically unsaturated monomers selected from alkyl esters of acrylic and/or methacrylic acid (denoted as (meth)acrylic acid), such as n-butyl (meth)acrylate, methyl (meth)acrylate, ethyl (meth)acrylate, 2-ethylhexyl (meth)acrylate, and/or cycloalkyl esters of (meth)acrylic acid, such as isobornyl (meth) acrylate and cyclohexyl (meth)acrylate. Optionally, vinylic monomers such as styrene, vinyl toluene, α-methyl styrene, vinyl acetate, vinyl esters of versatic acids, dienes such as 1,3-butadiene or isoprene, or mixtures thereof, or ethylenically unsaturated nitriles, such as (meth) acrylonitrile, or olefinically unsaturated halides, such as vinyl chloride, vinylidene chloride, and vinyl fluoride can be used in addition to the acrylic monomers.

The monomer composition also contains an ethylenically unsaturated monomer with a carboxylic acid group. Monomers that can be used include (meth)acrylic acid. Optionally, the acid groups can be latently present as, for example, in maleic anhydride, where the acid functionality is present in the form of an anhydride group. Also macro monomers comprising one or more carboxylic acid functional groups can be used. Preferably, monomers such as (meth)acrylic acid are used. Other possible carboxylic acid-functional monomers are oligomerized acrylic acids such as β-carboxyethyl acrylate or its higher analogues (commercially available from Rhodia as Sipomer B-CEA™), itaconic acid, fumaric acid, maleic acid, citraconic acid, or the anhydrides thereof. Apart from monomers having carboxylic acid functionality also monomers possessing an acid-functional group other than the carboxylic moiety can be present in the monomer composition, such as sulfonic, phosphoric, or phosphonic acid groups, by copolymerizing monomers such as ethylmethacrylate-2-sulfonic acid or the phosphate ester of 2-acrylamido-2-methylpropane sulfonic acid, 2-methyl-2-hydroxyethyl-2-propenoic acid, (1-phenylvinyl)phosphonic acid, or (2-phenylvinyl)phosphonic acid.

The composition furthermore contains an ethylenically unsaturated monomer comprising the ethylene-urea functionality

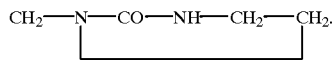

The most preferred monomer comprising the ethylene-urea functionality is N-(2-methacryloyloxethyl)ethylene urea:

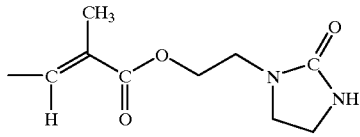

Apart from these monomers small amounts of monomers that posses a second functional group may be incorporated into the monomer mixture.

Examples of such monomers are hydroxy-functional monomers such as hydroxyethyl (meth)acrylate, hydroxypropyl (meth)acrylate, hydroxybutyl (meth)acrylate, (meth)acrylamide or derivatives of (meth)acrylamide such as N-methylol (meth)acrylamide and diacetone acrylamide. Also adducts of hydroxy-functional monomers with ethylene or propylene oxide can be present in the monomer composition The monomer composition must be chosen in such a way that the overall glass transition temperature of the resulting polymer as calculated using the Fox equation is lower than −15° C. (258 K).

The Fox equation, which is well known in the art, is represented by the formula:

$$1/Tg = W_1/Tg(1) + W_2/Tg(2) + W_3/Tg(3) + \ldots$$

wherein $W_1$, $W_2$, $W_3$, etcetera, are the weight fractions of the comonomers (1), (2), and (3), (etcetera), and Tg(1), Tg(2), Tg(3) mean the glass transition temperatures of their respective homopolymers.

The amount of monomers with carboxylic acid-functional groups is adjusted to obtain a polymer with an acid value of 15 to 100 mg KOH/g, preferably from 35 to 75 mg KOH/g.

The amount of ethylene-urea functional monomers in the polymer is from 0.1 to 5 wt. %, based on the total of monomers.

The polymer can be prepared by means of emulsion polymerization or by conventional free radical polymerization in an organic solvent followed by emulsification into water and complete or partial removal of the solvent.

The process conditions are chosen in such a way that the resulting polymer has a weight average molecular weight below 200,000, preferably below 150,000.

Preparation of the polymer dispersion by means of emulsion polymerization is preferred.

To the water borne polymer dispersion a water-soluble complex of a transition metal is added. Preferred is a complex containing zinc. Most preferred is zinc ammonium carbonate. In order to ensure stability of the resulting composition, the pH of the polymer dispersion is adjusted to a value above 7 using ammonia or other neutralizing bases. Optionally, a blend of different bases can be used.

The amount of transition metal complex added to the polymer dispersion is chosen in such a way that the ratio between the moles of transition metal ions in the complex and the overall moles of carboxylic acid groups in the polymer is 1:1 to 1:8. Preferably, the ratio is 1:2 to 1:4.

The polymer composition thus obtained can be formulated in clear or pigmented wood coatings that can be used to coat wooden substrates or substrates made from processed wood such as hardboard, paper, chipboard.

The invention is further illustrated by the following examples.

EXAMPLE 1

Preparation of a Water-soluble Zinc Complex 25.92 g of zinc oxide and 45.72 g of ammonium carbonate were mixed with 85.10 g of water in a stirred reactor. To this mixture 51.48 g of a 25% aqueous solution of ammonia were added. The resulting product was a clear solution.

EXAMPLE 2

Polymer Dispersion Containing Zinc Complex of Example 1

A reactor was charged with a solution of 23.8 g of Rhodafac RS710™ (fatty alcohol ether phosphate from Rhodia) in 1,533 g of demineralized water. This mixture was heated to 72° C. under a nitrogen blanket. In the meantime a monomer pre-emulsion was prepared with the ingredients given in the following table (pbw):

| | |
|---|---|
| Demineralized water | 702.1 |
| Rhodafac RS710 ™ | 14.75 |
| Ammonia (25% solution) | 5 |
| 2-Ethyl hexyl acrylate | 1052 |
| Methyl methacrylate | 115.7 |
| Methacrylic acid | 210.2 |
| Styrene | 499.5 |
| Nourycryl MA-123 ™* | 15.78 |
| Butyl acrylate | 473.1 |
| Butyl methacrylate | 262.9 |
| Octyl mercaptane | 4 |

*Nourycryl MA-123 ™ is N-(2-methacryloyloxethyl)ethylene urea, 50% solution in methyl methacrylate, ex Akzo Nobel.

98.8 g of this pre-emulsion were added to the reactor followed by a solution of 3 g of ammonium persulfate in 27.35 g of demineralized water. 27.35 g of demineralized water were used to rinse the container and feed lines. An exothermic reaction started that raised the temperature of the batch to 75° C. After 15 min 0.4 g of a 25% aqueous ammonium hydroxide solution was added to the reactor. 0.46 g of demineralized water was used to rinse the container and feed lines.

The monomer pre-emulsion was then dosed to the reactor over a period of 150 min. 136.7 g of demineralized water were used to rinse the container and feed lines. Simultaneously, a solution of 5 g of ammonium persulfate in 364.6 g of demineralized water were added to the reactor. 68.37 g of demineralized water were used to rinse the container and feed lines. The temperature during the addition of the pre-emulsion and the initiator solution was kept constant at 79° C. After the addition had finished, the batch was kept at 79° C. for an additional 30 min.

The batch was then cooled to 65° C. 25.53 g of a 25% aqueous ammonia solution were added to the reactor over a period of 15 min. 27.53 g of demineralized water were used to rinse the container and feed lines.

A solution of 4 g of a 70% aqueous solution of tert-butyl hydroperoxide in 27.35 g of demineralized water was added to the reactor. 27.35 g of demineralized water were used to rinse the container and feed lines.

A solution of 2 g of sodium formaldehyde sulfoxylate in 27.35 g of demineralized water was added to the reactor over a period of 15 min. 27.53 g of demineralized water were used to rinse the container and feed lines. Aqueous ammonia was added to adjust the pH of the polymer dispersion to a value of 7.5. 600 g of the zinc ammonium carbonate solution of Example 1 were slowly added under stirring. Additionally, demineralized water was added to adjust the solids content to 42%. The polymer dispersion was filtered through a 50-micron filter bag.

The resulting dispersion had a pH value of 9.1.

The resulting polymer was analyzed by means of gel permeation chromatography using a PLgel 5 μm MIXED-C 600™ column (from Polymer Laboratories) using tetrahydrofuran with 2% acetic acid as eluent. The molecular weight was determined relative to polystyrene standards. A value of 133,000 was found for the weight average molecular weight.

EXAMPLE 3

Pigmented Wood Coating

A mill base was prepared using the following ingredients (pbw):

| | | |
|---|---|---|
| Water | 55.0 | |
| Orotan 850E ™ | 10.0 | |
| Triton CF10 ™ | 2.0 | |
| Tamol 731 ™ (25% aqueous solution) | 20.0 | |
| Proxel XL2 ™ | 2.0 | |
| Blanc de Zinc COR ™ | 10.0 | |
| Durcal 5 ™ | 75.0 | |
| Ti Pure 706 ™ | 200.0 | |
| Foamaster 111 ™ | 2.0 | |

The mill base was dispersed on a horizontal pearl mill until the desired fineness was obtained. This mill base was used to prepare a white primer composition as indicated below:

| | |
|---|---|
| Polymer dispersion of Example 2 | 520.0 |
| Mill base | 376.0 |
| Texanol ™ | 30.0 |
| Foamaster 111 ™ | 2.0 |
| Water | 60.0 |
| Coapur 3025 ™ | 8.0 |
| Primal RM8 ™/Water mixture (⅓) | 4.0 |

The resulting paint had a VOC (calculated) of 93 g/l. The primer could be used as such for brush application.

When applied to merbau, the paint dried to form a hard coating at room temperature. After the application, no bleeding of tannins could be observed. After seven days the coated merbau panel was placed in a humidity cabinet for several days. Once again no discoloration due to bleeding of tannins was observed.

EXAMPLE 4

Clear Wood Sealer

| | |
|---|---|
| Polymer dispersion of Example 2 | 911 |
| Texanol ™ | 52 |
| Tegofoamex 805 ™ | 2 |
| Aquacer 805 ™ | 28 |
| Proxel XL2 ™ | 2 |
| Primal RM8 ™ (25% solution in water) | 5 |

The clear wood sealer obtained by blending the mixture above was applied onto tannin-containing wood substrates. The coating dried to a hard film at ambient temperature. No discoloration due to the bleeding of tannins was observed. A clear or a white top coat could be applied on top of the dried sealer. When placed in a humidity cabinet after seven days of drying at room temperature, no discoloration of the top coat due to tannin bleeding was observed.

Comparative Example A

A polymer dispersions according to EP 849,004 was prepared as follows.

A reactor was charged with a solution of 13.73 g of Rhodpex CO-436™ (ammonium salt of sulfated alkylphenol ethoxylates from Rhodia) in 938 g of demineralized water. This mixture was heated to 85° C. under a nitrogen blanket. In the meantime a monomer pre-emulsion was prepared with the ingredients given in the following table (pbw):

| | |
|---|---|
| Demineralized water | 508.5 |
| Rhodapex CO-436 ™ | 15.08 |
| Butyl acrylate | 398.1 |
| Methyl methacrylate | 474.4 |
| Methacrylic acid | 54.53 |
| Plex 6844-0 ™* | 218.1 |
| Octyl mercaptane | 10.88 |

*Plex 6844-0 ™ is N-(2-methacryloyloxethyl)ethylene urea, 25 wt. % solution in methyl methacrylate, ex Hüls AG.

83.95 g of this pre-emulsion were added to the reactor followed by a solution of 2.77 g of sodium persulfate in 15 g of demineralized water. The temperature of the batch rose to 88° C. After 5 min a solution of 2.7 g of sodium hydrogencarbonate in 41.25 g of demineralized water was used to rinse the container and feed lines. The monomer pre-emulsion was then dosed to the reactor over a period of 90 min. 33.75 g of demineralized water were used to rinse the container and feed lines. Simultaneously, a solution of 1.35 g of ammonium persulfate in 67.50 g of demineralized water was added to the reactor. The temperature during the addition of the pre-emulsion and the initiator solution was kept constant at 85° C. After the addition had finished, the batch was kept at 85° C. for an additional 15 min.

The batch was then cooled to 65° C. A solution of 2 g of tertiary-butyl hydroperoxide (70 wt. % in water) in 10 g of demineralized water was slowly added to the reactor.

A solution of 0.95 g of isoascorbic acid in 12.5 g of demineralized water was added to the reactor over a period of 15 min. 20 g of demineralized water were used to rinse the container and feed lines. The batch was than held at 65° C. for 30 min. 6.01 g of aqueous ammonia in 20 g of demineralized water were added to adjust the pH of the polymer dispersion. Additionally, demineralized water was added to adjust the solids content to 40 wt. %. The polymer dispersion was filtered through a 50-micron filter bag. The resulting dispersion had a pH value of 6.9.

Comparative Examples B and C

A polymer dispersion was prepared as described in Example 2 but with the omission of Nourycryl MA-123™ from the pre-emulsion. Before the addition of the water-soluble zinc complex from Example 1, a fraction of the dispersion was removed from the reactor. This fraction is referred to as example B. The remainder of the dispersions was blended with the water-soluble zinc complex from Example 1 as outlined in Example 2. The amount of zinc complex was adjusted to compensate for the fraction removed from the reactor. The resulting polymer dispersion is referred to as example C. The resulting dispersion had a pH value of 9.1. In this example the importance of ethylene urea functionality in de polymer dispersion is evidenced.

EXAMPLES 5 TO 8

Pigmented Wood Coatings

Pigmented wood coatings were prepared using the mill base described in Example 3. This mill base was used to prepare white primer compositions as indicated below:

| Ingredient | Ex. 5 | Ex. 6 | Ex. 7 | Ex. 8 |
|---|---|---|---|---|
| Polymer dispersion from Example 2 | 520 | | | |
| Polymer dispersion from Example A | | 535 | | |
| Polymer dispersion from Example B | | | 473 | |
| Polymer dispersion from Example C | | | | 535 |
| Mill base (L62) | 376 | 353 | 365 | 381 |
| Texanol | 30 | 28 | 34 | 20 |
| Foamaster 111 ™ | 2 | 2 | 2 | 2 |
| Demineeralized Water | 60 | 70 | 122 | 51 |
| Coapur 3025 ™ | 8 | 5 | 5 | 5 |
| Primal RM 8 ™/demineralized Water ⅓ | 4 | 7 | 0 | 6 |

The coatings of Examples 5 to 8 were applied to merbau panels, with the paint drying at room temperature. The panels were placed in a humidity cabinet at 40° C. and 100% relative humidity. After one day discoloration due to bleeding of tannins (appearance) and adhesion were compared.

| | Ex. 5 | Ex. 6 | Ex. 7 | Ex. 8 |
|---|---|---|---|---|
| Adhesion on merbau | ++ | + | -- | + |
| Appearance on merbau | + | − | − | + |

++ very good; + good; − not good; -- poor

From this comparison it becomes evident that the pigmented coating based on the polymer dispersion prepared according to the invention combines good tannin blocking properties with excellent adhesion.

What is claiemd is:

1. A water borne binder composition comprising
   a) an aqueous dispersion of an acrylic copolymer comprising carboxylic acid and ethylene-urea functionalities, having a weight average molecular weight below 200,000 and a Tg<−15° C., and
   b) a water-soluble complex of a transition metal.

2. The water borne binder composition of claim 1 wherein the transition metal is zinc.

3. The water borne binder composition of claim 1, wherein the ratio of the moles of transition metal in the complex to the moles of carboxylic acid groups in the copolymer is between 1:1 and 1:8.

4. The water borne binder composition of claim 1, wherein the ratio of the moles of transition metal in the complex to the moles of carboxylic acid groups in the copolymer is between 1:2 and 1:4.

5. The water borne binder composition of claim 1, wherein the weight average molecular weight is below 150,000.

6. The water borne binder composition of claim 1, wherein the acrylic copolymer is obtained from an alkyl and/or a cycloalkyl ester of acrylic and/or methacrylic acid, an ethylenically unsaturated acid or an anhydride thereof, an ethylenically unsaturated compound comprising the ethylene-urea functionality of the formula

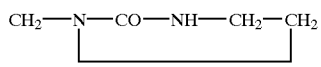

and optionally vinylic monomers and/or olefinically unsaturated halides or nitriles.

7. The water borne binder composition of claim 1, wherein the acrylic copolymer is obtained from an alkyl and/or a cycloalkyl ester of acrylic and/or methacrylic acid, an ethylenically unsaturated acid or an anhydride thereof, an ethylenically unsaturated compound of the formula

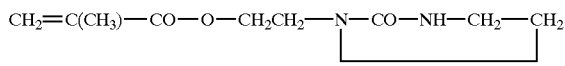

and optionally vinylic monomers and/or olefinically unsaturated halides or nitriles.

8. The water borne binder composition of claim 1, wherein the amount of ethylenically unsaturated compound comprising the ethylene-urea functionality is 0.1–5 wt. % of the total of monomers.

9. The water borne binder composition of claim 1, wherein the acid value is about 15 to about 100.

10. A coating composition made of the water borne binder composition of claim 1.

11. A wood substrate coated with the coating composition of claim 10.

12. The water borne binder composition of claim 9 wherein the acid value is about 35 to about 75 mq KOH/g.

13. A water borne binder composition for substrates containing water-soluble chromophoric compounds that comprises:
   a) an aqueous dispersion of an acrylic copolymer comprising carboxylic acid and ethylene-urea functionalities, having a weight average molecular weight below about 200,000 and a Tg less than about −15° C., and
   b) a water-soluble complex of a transition metal.

* * * * *